United States Patent
Trautman et al.

(10) Patent No.: US 9,427,867 B2
(45) Date of Patent: Aug. 30, 2016

(54) LOCALIZATION WITHIN AN ENVIRONMENT USING SENSOR FUSION

(71) Applicant: The Boeing Company, Chicago, IL (US)

(72) Inventors: Peter F. Trautman, Seattle, WA (US); Hui Li, Seattle, WA (US); Robert P. Higgins, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 14 days.

(21) Appl. No.: 14/243,419

(22) Filed: Apr. 2, 2014

(65) Prior Publication Data

US 2015/0283700 A1 Oct. 8, 2015

(51) Int. Cl.
 G06F 19/00 (2011.01)
 B25J 9/16 (2006.01)
 G05D 1/02 (2006.01)

(52) U.S. Cl.
 CPC ............... B25J 9/16 (2013.01); G05D 1/0236 (2013.01); G05D 1/0248 (2013.01); G05D 1/0253 (2013.01); G05D 1/0272 (2013.01); G05D 1/0274 (2013.01); G05D 2201/0216 (2013.01); Y10S 901/01 (2013.01)

(58) Field of Classification Search
 CPC combination set(s) only.
 See application file for complete search history.

(56) References Cited

U.S. PATENT DOCUMENTS

| | | | |
|---|---|---|---|
| 7,317,836 B2* | 1/2008 | Fujimura et al. | 382/203 |
| 8,401,225 B2 | 3/2013 | Newcombe et al. | |
| 8,401,242 B2* | 3/2013 | Newcombe et al. | 382/107 |
| 2004/0167667 A1* | 8/2004 | Goncalves et al. | 700/245 |
| 2005/0182518 A1 | 8/2005 | Karlsson | |
| 2005/0238200 A1* | 10/2005 | Gupta et al. | 382/103 |
| 2007/0156286 A1* | 7/2007 | Yamauchi | 700/245 |
| 2008/0152191 A1* | 6/2008 | Fujimura et al. | 382/103 |
| 2009/0024251 A1 | 1/2009 | Myeong et al. | |

FOREIGN PATENT DOCUMENTS

WO WO9309509 A1 5/1993

OTHER PUBLICATIONS

Sturm et al., "A Benchmark for the Evaluation of RGB-D SLAM Systems," IEEE International Conference on Intelligent Robots and Systems (IROS), Oct. 2012, pp. 573-580.

Henry et al., "RGB-D Mapping: Using Depth Cameras for Dense 3D Modeling of Indoor Environments," International Symposium on Robotics Research, Aug. 2011, 15 pages.

Fraundorfer et al., "Visual Odometry—Part II: Matching, Robustness, Optimization, and Applications," IEEE Robotics & Automation Magazine, vol. 19, Issue 2, Jun. 2012, pp. 78-90.

(Continued)

*Primary Examiner* — Bhavesh V Amin
(74) *Attorney, Agent, or Firm* — Yee & Associates, P.C.

(57) ABSTRACT

A method and apparatus for guiding a mobile platform within an environment may be provided. A number of first type of data streams and a number of second type of data streams may be generated using a plurality of data systems. A probability distribution may be applied to each of the number of second type of data streams to form a number of modified data streams. The number of first type of data streams and the number of modified data streams may be fused to generate a pose estimate with a desired level of accuracy for the mobile platform with respect to an environment around the mobile platform.

25 Claims, 9 Drawing Sheets

(56) References Cited

OTHER PUBLICATIONS

Konolige et al., "Large Scale Visual Odometry for Rough Terrain," International Symposium on Robotics Research, Nov. 2007, pp. 201-212.

Izadi et al., "KinectFusion: Real-time 3D Reconstruction and Interaction Using a Moving Depth Camera," The Association for Computing Machinery, Symposium on User Interface Software and Technology, Oct. 2011, 10 pages.

Newcombe et al., "KinectFusion: Real-Time Dense Surface Mapping and Tracking," IEEE International Symposium on Mixed and Augmented Reality, Oct. 2011, 10 pages.

Thrun, "Probabilistic Robotics," The Association for Computing Machinery, Communications of the ACM, vol. 45, No. 3, Mar. 2002, pp. 52-57.

Extended European Search Report, dated Jun. 21, 2016, regarding Application No. EP15162043.2, 8 pages.

\* cited by examiner

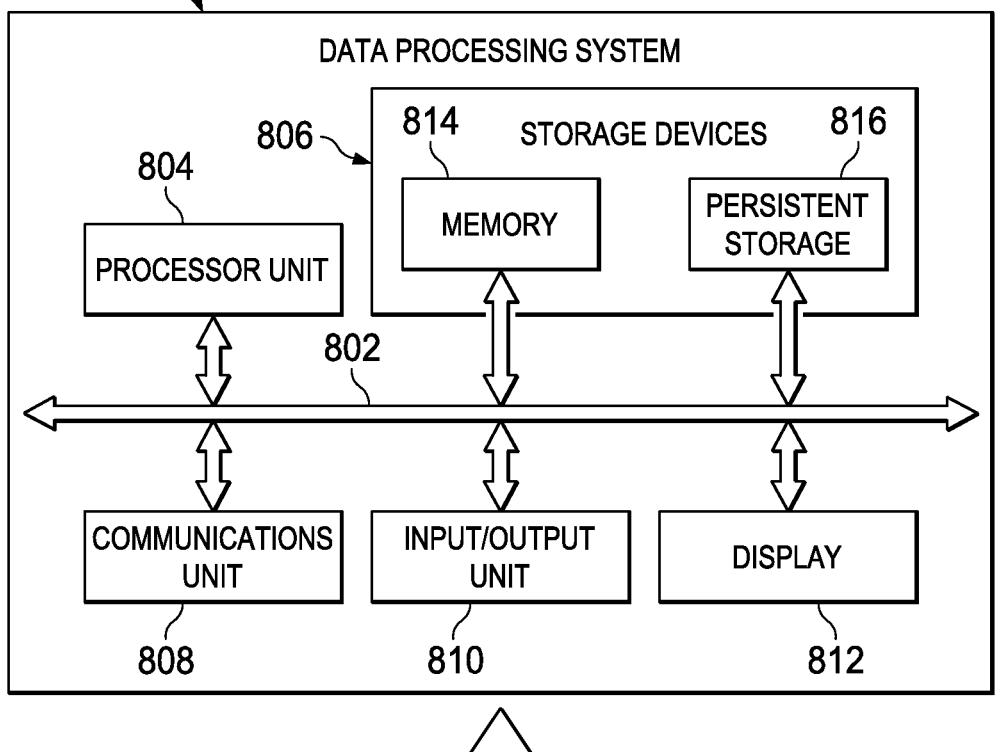
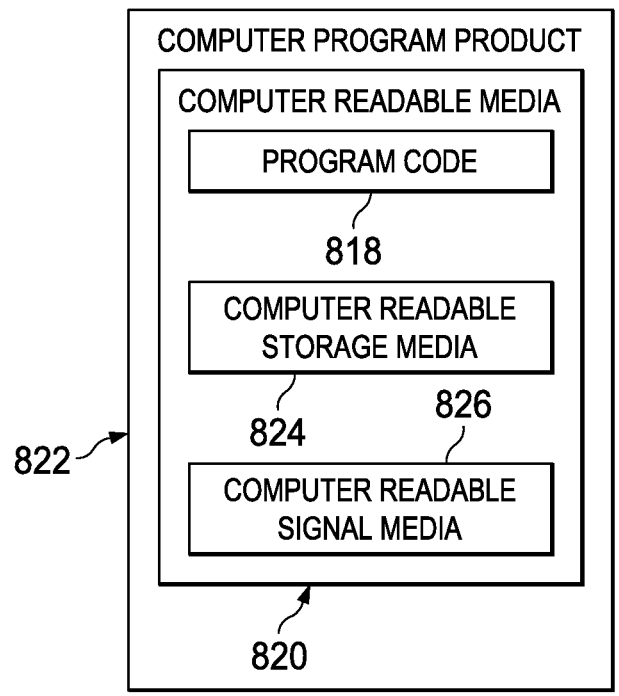
FIG. 8

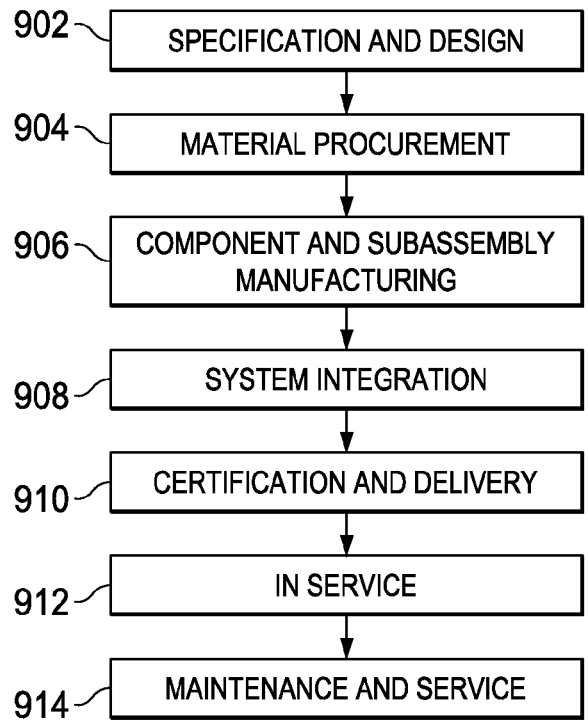
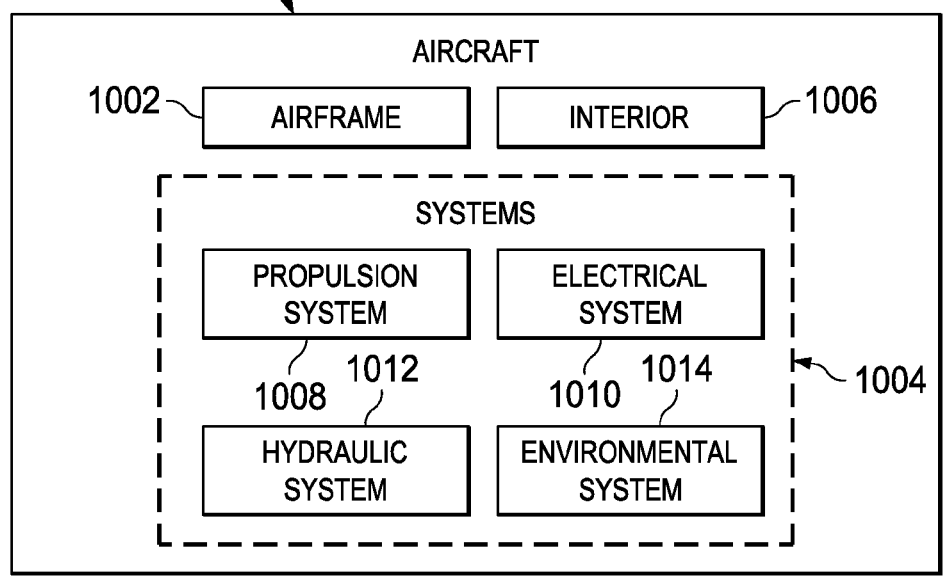

LOCALIZATION WITHIN AN ENVIRONMENT USING SENSOR FUSION

BACKGROUND INFORMATION

1. Field

The present disclosure relates generally to identifying the pose of a mobile platform in an environment. More particularly, the present disclosure relates to a method and apparatus for forming and fusing data streams that each include a measure of uncertainty to generate a pose estimate for the mobile platform within the environment.

2. Background

In some situations, it may be desirable to have a mobile robot that can move freely within an environment much in the way a human would. Physical landmarks, such as paint, tape, or magnets, which may typically be used to help a mobile robot move within an environment, may constrain a mobile robot to only follow pre-defined routes. Further, installing these types of physical landmarks may be more time-consuming and expensive than desired. To move more freely within an environment, a mobile robot may need to perform localization, which includes identifying the pose of the mobile robot within the environment. As used herein, a "pose" includes a position, an orientation, or both with respect to a reference coordinate system.

A mobile robot may use an external sensor system to perform localization. However, in some cases, line of sight between a mobile robot and the external sensor system may be obstructed by other objects, robots, and/or persons within the manufacturing environment. As one example, in an aircraft manufacturing environment, line of sight may be lost when the mobile robot operates underneath a wing of the aircraft, inside the wing, in the vicinity of factory objects such as cranes or columns, and/or in restricted areas. Once line of sight is lost, the mobile robot may stop receiving pose updates and may need to halt operations until line of sight has been recovered. Without localization, the mobile robot may be unable to navigate through the environment as precisely as desired.

Further, in a dynamic environment, carts, planes, work stations, vehicles, equipment platforms, other types of devices, human operators, or some combination thereof may move. Consequently, a mobile robot may be unable to solely rely on its surroundings to move through this type of environment or an environment filled with clutter or not segmented or structured efficiently. Currently available mobile robots may be unable to operate with the levels of performance and efficiency desired or maneuver around human operators in a manner as safe as desired in these different types of environments.

Additionally, in some cases, the equipment or devices used for localization may be more expensive, larger, or heavier than desired. In certain situations, the processing required to perform the localization with a desired level of accuracy may be more time-consuming or require more processing resources than desired. Therefore, it would be desirable to have a method and apparatus that take into account at least some of the issues discussed above, as well as other possible issues.

SUMMARY

In one illustrative embodiment, an apparatus may comprise a plurality of data systems, a modifier, and a pose estimator. The plurality of data systems may be configured to generate a plurality of data streams. The plurality of data streams may include a number of first type of data streams and a number of second type of data streams. The modifier may be configured to apply a probability distribution to each of the number of second type of data streams to form a number of modified data streams. The pose estimator may be located onboard a mobile platform and may be configured to receive and fuse the number of first type of data streams and the number of modified data streams to generate a pose estimate with a desired level of accuracy for the mobile platform with respect to an environment around the mobile platform.

In another illustrative embodiment, a mobile platform may comprise a base, a controller associated with the base, and a movement system associated with the base. The controller may be further configured to receive data streams from a plurality of data systems in which data streams may include a number of first type of data streams and a number of second type of data streams. The controller may comprise a modifier and a pose estimator. The modifier may be configured to apply a probability distribution to each of the number of second type of data streams to form a number of modified data streams. The pose estimator may be configured to receive the number of first type of data streams and the number of modified data streams. The pose estimator may be further configured to fuse the plurality of data streams together to generate a pose estimate with a desired level accuracy for the mobile platform with respect to an environment around the mobile platform. The movement system may be configured to be controlled by the controller based on the pose estimate to move the mobile platform within the environment.

In yet another illustrative embodiment, a method for guiding a mobile platform within an environment may be provided. A number of first type of data streams and a number of second type of data streams may be generated using a plurality of data systems. A probability distribution may be applied to each of the number of second type of data streams to form a number of modified data streams. The number of first type of data streams and the number of modified data streams may be fused to generate a pose estimate with a desired level of accuracy for the mobile platform with respect to an environment around the mobile platform.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of a data processing system in the form of a block diagram in accordance with an illustrative embodiment;

FIG. 9 is an illustration of an aircraft manufacturing and service method in the form of a block diagram in accordance with an illustrative embodiment; and FIG. 10 is an illustration of an aircraft in the form of a block diagram in accordance with an illustrative embodiment.

DETAILED DESCRIPTION

The illustrative embodiments recognize and take into account different considerations. For example, the illustrative embodiments recognize and take into account that it may be desirable to have a method and apparatus capable of more accurately and quickly performing localization for a number of mobile platforms within a manufacturing environment. Further, the illustrative embodiments recognize and take into account that it may be desirable to have a method and apparatus for generating a pose estimate for a mobile robot within an environment onboard the mobile robot.

Thus, the illustrative embodiments provide a method and apparatus for generating a pose estimate for a mobile robot onboard the mobile robot using sensor fusion. The method and apparatus provided by the illustrative embodiments may reduce the time needed to generate a pose estimate, while increasing the accuracy of the estimate. Further, the solution provided by the illustrative embodiments may be simpler and more cost-effective than some currently available solutions.

Figure 1:
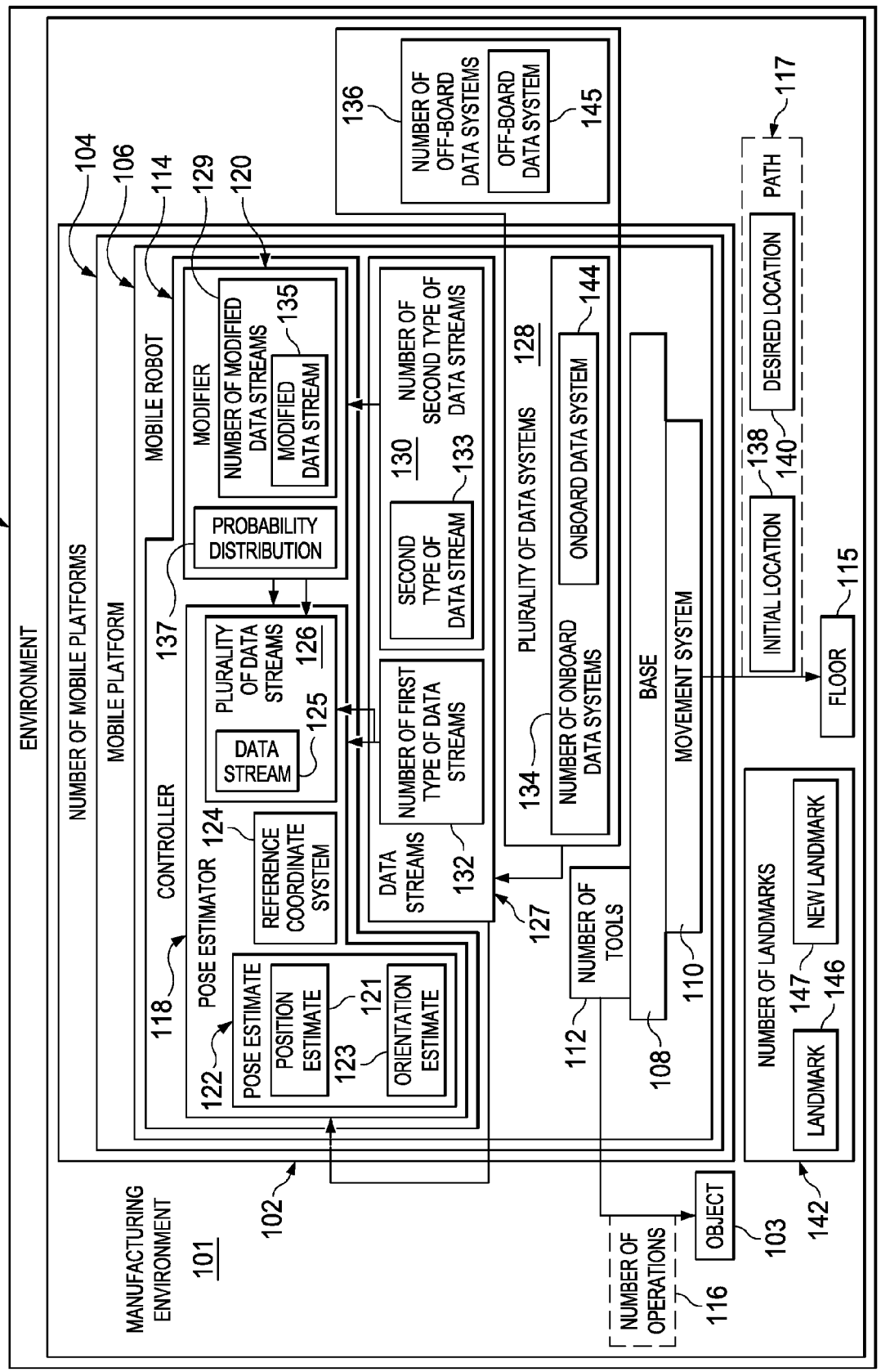
FIG. 1 is an illustration of an environment in the form of a block diagram in accordance with an illustrative embodiment.

Referring now to the figures and, in particular, with reference to FIG. 1, an illustration of an environment is depicted in accordance with an illustrative embodiment. In this illustrative example, environment 100 may be any environment in which number of mobile platforms 102 may be used. As used herein, a "number of" items may be one or more items. In this manner, number of mobile platforms 102 may include one or more mobile platforms.

In one illustrative example, environment 100 may take the form of manufacturing environment 101 in which object 103 is being manufactured. Object 103 may take a number of different forms. For example, without limitation, object 103 may take the form of a door, a skin panel, a wing for an aircraft, a fuselage for an aircraft, a structural component for a building, an assembly of components, or some other type of object.

As depicted, mobile platform 104 may be an example of one implementation for a mobile platform in number of mobile platforms 102. In this illustrative example, mobile platform 104 may take the form of mobile robot 106. Of course, depending on the implementation, mobile platform 104 may take the form of any type of platform, structure, device, or object capable of at least partially autonomously moving within environment 100.

As depicted, mobile robot 106 may include base 108, movement system 110, number of tools 112, and controller 114. Movement system 110, number of tools 112, and controller 114 may be associated with base 108. As used herein, when one component is "associated" with another component, the association is a physical association in the depicted examples.

For example, without limitation, a first component, such as movement system 110, may be considered to be associated with a second component, such as base 108, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

Movement system 110 may be used to move mobile robot 106 within environment 100. For example, without limitation, movement system 110 may be used to move mobile robot 106 within environment 101. Depending on the implementation, movement system 110 may include at least one of a number of wheels, a number of rollers, a number of legs, a number of holonomic wheels, or other types of devices capable of providing movement.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this illustrative example, number of tools 112 may be used to perform number of operations 116 within environment 100. At least one of number of operations 116 may be performed on object 103. Number of operations 116 may include, for example, without limitation, at least one of a drilling operation, a fastening operation, a sanding operation, a painting operation, a machining operation, a testing operation, an imaging operation, or some other type of operation. In this manner, number of tools 112 may include, for example, without limitation, at least one of a drilling device, a fastening device, a sanding tool, a painting tool, a fluid dispensing system, a sealant application device, a machining device, a milling device, a testing system, an imaging device, a scanner, a marker, a pen, a label applicator, or some other type of tool.

In this illustrative example, controller 114 may be configured to control operation of at least one of number of tools 112. Further, controller 114 may be configured to control movement system 110. In particular, controller 114 may control movement system 110 to move mobile robot 106 along path 117 in environment 100. Path 117 may be at least partially along floor 115 of environment 100. As used herein, floor 115 may include a floor surface, a surface on a bridge, a surface formed by one or more pallets, a platform surface, a floor of an elevator, a floor of a conveyor belt, some other type of surface, or some combination thereof.

Path 117 may be a dynamically updated path in that controller 114 may update path 117 as mobile robot 106 moves through environment 100. Controller 114 may update path 117 as mobile robot 106 moves through environment 100 to help mobile robot 106, for example, without limitation, at least one of avoid obstacles, move around objects that have been newly placed or moved within environment 100, respond to changes in number of operations 116 to be performed by mobile robot 106, maneuver around human operators who are located in or moving around within environment 100, or respond to some other type of new or changed circumstance within environment 100. Controller 114 may use localization to help navigate mobile robot 106.

As depicted, controller 114 may include, for example, without limitation, pose estimator 118 and modifier 120. Pose estimator 118 may generate pose estimate 122 for mobile robot 106. Pose estimate 122 may be an estimation of the pose of mobile robot 106 within environment 100. The pose of mobile robot 106, as used herein, may be comprised of at least one of a position of mobile robot 106 or an orientation of mobile robot 106 with respect to reference coordinate system 124 for environment 100. Thus, pose estimate 122 may be comprised of at least one of position estimate 121 and orientation estimate 123 of mobile robot 106 with respect to reference coordinate system 124 for environment 100.

Mobile robot 106 may be configured to move with six degrees of freedom in environment 100. Thus, pose estimate 122 may be an estimate of the six degrees of freedom (6DoF) pose for mobile robot 106. In some cases, pose estimate 122 may be referred to as the estimate of the pose of mobile robot 106 in the six degrees of freedom space of mobile robot 106.

In this illustrative example, pose estimator 118 may fuse plurality of data streams 126 to generate pose estimate 122. At least a portion of plurality of data streams 126 may be received from plurality of data systems 128. As used herein, a data system in plurality of data systems 128 may include a number of sensor systems, a number of processor units, or some combination thereof. As used herein, a "sensor system" may be comprised of any number of sensor devices, active devices, passive devices, or combination thereof.

As used herein, "fusing" plurality of data streams 126 may mean combining and processing the different data streams in plurality of data streams 126 to generate a single pose estimate 122. Each of plurality of data streams 126 may be comprised of estimates generated over time.

Data stream 125 is an example of one of plurality of data streams 126. Data stream 125 may be generated by one of plurality of data systems 128. In this illustrative example, data stream 125 may be comprised of estimates generated over time.

As used herein, an "estimate" may be an estimate of the six degrees of freedom pose of mobile robot 106. This estimate may be generated based on measurements generated at either a single point in time or over a period of time. In some cases, the estimate may also include metadata. In some illustrative examples, the estimate may be referred to as an output data point such that data stream 125 may be comprised of a plurality of output data points.

Pose estimator 118 may use plurality of data streams 126 and a Bayesian estimation algorithm to generate pose estimate 122. In particular, pose estimator 118 may use the following Bayesian estimation equations:

$$p(x_{t+1}|z_T) = \int [p(x_{t+1}|x_t) * p(x_t|z_T)] \tag{1}$$

$$p(x_{t+1}|z_{t+1}) \propto p(z_{t+1}^1, \ldots, z_{t+1}^n | x_{t+1}) * p(x_{t+1}|z_T) \tag{2}$$

where t is time, $x_{t+1}$ is the pose of mobile robot 106 at time t+1, $z_T$ is the collection of all estimates in plurality of data streams 126 through time, T, $p(x_{t+1}|z_T)$ is the probability of $x_{t+1}$ given $z_T$, $x_t$ is the pose of mobile robot 106 at time t, n is the total number of data systems in plurality of data systems 128, $z_{t+1}^1$ is the estimate generated by a first data system in plurality of data systems 128 at time t+1, and $z_{t+1}^n$ is the estimate generated by the $n^{th}$ data system in plurality of data systems 128 at time t+1. For any given time t+1, $p(z_{t+1}^1, \ldots, z_{t+1}^n | x_{t+1})$ only includes data systems that have provided estimates at time time t+1.

The error in pose estimator 118 may be further reduced by increasing the number of data streams in plurality of data streams 126 used to generate pose estimate 122, and thereby the number of data systems in plurality of data systems 128. In other words, as the number of data streams in plurality of data streams 126 increases, the error in pose estimate 122 generated by pose estimator 118 decreases.

Using Bayesian estimation techniques to generate pose estimate 122 may require that all of the data used to generate pose estimate 122 be probabilistic. In other words, all of the data may need to include randomness or uncertainty.

However, data streams 127 generated by plurality of data systems 128 may include number of first type of data streams 132 and number of second type of data streams 130. A "first type of data stream," such as one of number of first type of data streams 132 may include data points in which each data point includes, or is coupled with, a measurement of uncertainty, based on some probability distribution. In particular, a first type of data stream may be generated by a probabilistic system, model, or algorithm in which the output or way an output is generated for a given input takes into account randomness or a degree of uncertainty. In this manner, each of number of first type of data streams 132 may be referred to as a probabilistic data stream in some illustrative examples.

As used herein, a "second type of data stream," such as one of number of second type of data streams 130 may include data points in which each data point does not include, or is not coupled with, a measurement of uncertainty. For example, without limitation, the data point may include only a single data value. In some illustrative examples, this second type of data stream may be referred to as a pseudo-deterministic data stream.

Number of second type of data streams 130 in data streams 127 may be received by modifier 120 in pose estimator 118. Modifier 120 may be configured to modify a second type of data stream to make the data stream usable by pose estimator 118. In particular, modifier 120 may convert number of second type of data streams 130 into a number of processed first type of data streams. All of the first type of data streams may then be processed by pose estimator 118 to generate pose estimate 122.

As one illustrative example, second type of data stream 133 may be generated by one of plurality of data systems 128. In this example, second type of data stream 133 may have been generated using one or more odometry techniques. Modifier 120 may be configured to modify second type of data stream 133 to form modified data stream 135 that is usable by pose estimator 118. Modifier 120 may convert second type of data stream 133 into modified data stream 135 using any number of techniques. As one illustrative example, modifier 120 may apply probability distribution 137 to second type of data stream 133 to form modified data stream 135.

Depending on the implementation, probability distribution 137 may be a Gaussian distribution or some other type of probability distribution. Probability distribution 137 may be a predetermined probability distribution. For example, without limitation, probability distribution 137 may have been determined empirically, using a mathematical model, or in some other manner prior to mobile robot 106 being used to perform number of operations 116 in environment 100.

By converting second type of data stream 133 into modified data stream 135, the need for probabilistic data generated using a physics-based model of mobile robot 106 may be eliminated. In particular, the term $p(x_{t+1}|x_t)$ in equation (1) described above may be provided using at least one of data streams 127 from plurality of data systems 128 instead of a physics-based model. For example, without limitation, pose estimator 118 may use a data stream from an odometry system in plurality of data systems 128 to provide the term $p(x_{t+1}|x_t)$ in equation (1) described above. The term $p(x_{t+1}|x_t)$ is the probability of the pose of mobile robot 106 at time t+1 given the pose of mobile robot 106 at time t.

In this manner, a probability distribution may be applied to each of number of second type of data streams 130 by modifier 120 to form number of modified data streams 129. Each of number of modified data streams 129 may be of the same as each of number of first type of data streams 132. Number of modified data streams 129 and number of first type of data streams 132 may together form plurality of data streams 126 used by pose estimator 118 to form pose estimate 122.

In this illustrative examples, plurality of data systems 128 may include number of onboard data systems 134 and number of off-board data systems 136. As used herein, an "onboard data system," such as one of number of onboard data systems 134, may be configured to generate a data stream onboard mobile robot 106. In some cases, an onboard data system may be completely separate from controller 114. In other illustrative examples, at least a portion of an onboard data system may be implemented within or integrated with controller 114. The data stream generated by the onboard data system may be received by pose estimator 118 or modifier 120, depending on whether the data stream is a second type of data stream or a first type of data stream.

Onboard data system 144 may be an example of one of number of onboard data systems 134. Onboard data system 144 may include at least one of a passive element, an active element, a processor unit, an integrated circuit, a microprocessor, a sensor system, a target, or some type of other device or element. At least the portion of onboard data system 144 that generates a data stream is located onboard mobile robot 106. In this manner, all of onboard data system 144 may be located onboard mobile robot 106 or one portion of onboard data system 144 may be located onboard, while another portion may be located off-board.

As used herein, an "off-board data system," such as one of number of off-board data systems 136, may be a data system configured to generate a data stream remotely with respect to mobile robot 106. The data stream generated by the off-board data system may then be sent to controller 114 using, for example, without limitation, a wireless communications link.

Off-board data system 145 may be an example of one of number of off-board data systems 136. Off-board data system 145 may include at least one of a passive element, an active element, a processor unit, an integrated circuit, a microprocessor, a sensor system, a target, or some type of other device or element. At least the portion of off-board data system 145 that generates a data stream is located off-board mobile robot 106. In this manner, all of off-board data system 145 may be located off-board or one portion of off-board data system 145 may be located off-board, while another portion may be located onboard.

Additionally, controller 114 may be configured to reduce error in moving mobile robot 106 along path 117. In particular, controller 114 may reduce the random error in moving mobile robot 106 from initial location 138 along path 117 to desired location 140 along path 117 to within selected tolerances. In one illustrative example, controller 114 may use one or more of number of onboard data systems 134 to reduce this random error.

In particular, controller 114 may use one or more of number of onboard data systems 134 configured to observe number of landmarks 142 within environment 100 to reduce the random error in moving mobile robot 106 from initial location 138 along path 117 to desired location 140 along path 117. A landmark in number of landmarks 142 may be any recognizable feature in environment 100. For example, without limitation, a landmark may take the form of a pillar, a platform, a structural feature, a piece of equipment, a manmade structure, a target, a label, or some other type of landmark.

In this illustrative example, onboard data system 144 may include a sensor system capable of observing at least one of number of landmarks 142 in environment 100 while mobile robot 106 is at initial location 138 within environment 100. For example, without limitation, onboard data system 144 may observe landmark 146 of number of landmarks 142 while at initial location 138. The observation of landmark 146 may be made a selected number of times. For example, N observations may be made of landmark 146.

Landmark 146 may be a natural or manmade landmark, depending on the implementation. In this illustrative example, landmark 146 may be a stationary landmark. However, in other illustrative example, landmark 146 may be mobile and capable of moving within environment 100 as needed. In some illustrative examples, landmark 146 may be a person.

Onboard data system 144 may be used to identify an initial relative distance between initial location 138 of mobile robot 106 and landmark 146. As the number of observations of landmark 146 made increases, the error in the initial relative distance between the initial location of mobile robot 106 and landmark 146 decreases. The reduction in error is based on the central limit theorem.

In particular, the central limit theorem may be exploited such that the error may be reduced by a factor of the square root of n, where n is the total number of observations made. The central limit theorem states that, under certain conditions, the sum of n independent, identically-distributed random variables, when appropriately scaled, may converge in distribution to a standard normal distribution. Thus, in one illustrative example, by increasing n, the empirical covariance will decrease at a rate given as follows:

$$(\sigma)/\sqrt{n} \quad (3)$$

where σ is the standard deviation with respect to the mean.

Mobile robot 106 may then be moved to a new location as far as possible towards the direction of desired location 140 without losing landmark 146 within the field of view of the sensor system of onboard data system 144. Onboard data system 144 may identify a new relative distance between the new location of mobile robot 106 and landmark 146. The difference between the initial relative distance and the new relative distance may then be computed with minimal error and used to determine the new location of mobile robot 106.

If the new location is not desired location 140 within selected tolerances, mobile robot 106 may then be moved closer to desired location 140 using new landmark 147. In particular, onboard data system 144 may search for new landmark 147 in number of landmarks 142, while at the new location. While at the new location, onboard data system 144 may then observe new landmark 147 the selected number, N, of times. In this manner, new landmark 147 may be considered "correlated" with landmark 146 at the new location.

The process of moving to another location as close as possible to desired location 140 and the operations performed while at this other location, as described above, may then be repeated. This type of movement and processing may be repeated until mobile robot 106 has reached desired location 140 within selected tolerances. This type of process may reduce the overall error associated with moving mobile robot 106 from initial location 138 to desired location 140 to within selected tolerances, as compared to moving mobile robot 106 without using number of landmarks 142 and observing each landmark from number of landmarks 142 a selected number, N, of times.

Figure 2:
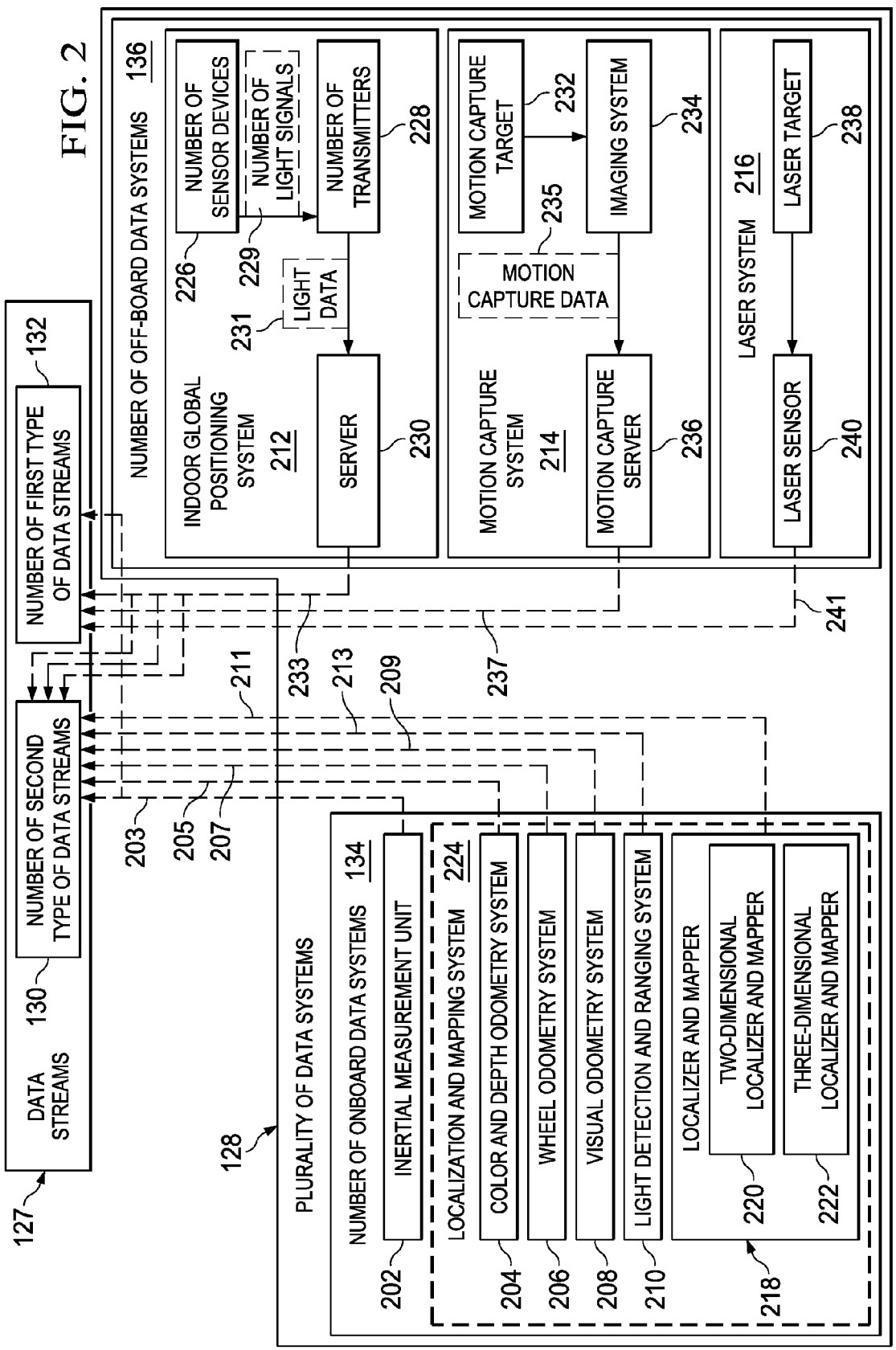
FIG. 2 is an illustration of a plurality of data systems in the form of a block diagram in accordance with an illustrative embodiment.

With reference now to FIG. 2, an illustration of plurality of data systems 128 from FIG. 1 is depicted in the form of a block diagram in accordance with an illustrative embodiment. As depicted, plurality of data systems 128 may include number of onboard data systems 134 and number of off-board data systems 136.

In this illustrative example, plurality of data systems 128 may include inertial measurement unit 202, color and depth odometry system 204, wheel odometry system 206, visual odometry system 208, light detection and ranging system 210, indoor global positioning system 212, motion capture system 214, and laser system 216. Inertial measurement unit 202, color and depth odometry system 204, wheel odometry system 206, visual odometry system 208, and light detection and ranging system 210 may be part of number of onboard data systems 134. Indoor global positioning system 212, motion capture system 214, and laser system 216 may be part of number of off-board data systems 136.

In this illustrative example, inertial measurement unit 202 may measure relative displacement of mobile robot 106 within environment 100 by sensing velocity, orientation, and acceleration. Inertial measurement unit 202 may generate data stream 203 that may be sent to controller 114 as one of data streams 127. Depending on the manner in which inertial measurement unit 202 is implemented, data stream 203 may be considered one of number of first type of data streams 132 or one of number of second type of data streams 130.

Color and depth odometry system 204 may be used to provide color data and depth data for environment 100. Wheel odometry system 206 may be used to measure relative displacement of mobile robot 106 within environment 100 when movement system 110 in FIG. 1 includes wheels. Visual odometry system 208 may use cameras to estimate the relative displacement of mobile robot 106 within environment 100. Light detection and ranging system 210 may generate laser scans of environment 100.

Each of color and depth odometry system 204, wheel odometry system 206, visual odometry system 208, and light detection and ranging system 210 may be located entirely onboard mobile robot 106. In one illustrative example, color and depth odometry system 204, wheel odometry system 206, visual odometry system 208, and light detection and ranging system 210 may generate data stream 205, data stream 207, data stream 209, and data stream 211, respectively, that may be sent to controller 114 as part of data streams 127. In this illustrative example, each of data stream 205, data stream 207, data stream 209, and data stream 211 may be included in number of first type of data streams 132 or number of second type of data streams 130, depending on the implementation. In this illustrative example, each of data stream 205, data stream 207, data stream 209, and data stream 211 may be included in number of second type of data streams 130.

In other illustrative examples, one or more of data stream 205, data stream 207, data stream 209, and data stream 211 generated by color and depth odometry system 204, wheel odometry system 206, visual odometry system 208, and light detection and ranging system 210, respectively, may be sent to localizer and mapper 218. Localizer and mapper 218 may be implemented within controller 114 in FIG. 1 or separate from controller 114, depending on the implementation.

Further, localizer and mapper 218 may take the form of two-dimensional localizer and mapper 220 or three-dimensional localizer and mapper 222, depending on the implementation. In some cases, color and depth odometry system 204, wheel odometry system 206, visual odometry system 208, light detection and ranging system 210, and localizer and mapper 218 may together form localization and mapping system 224. Localization and mapping system 224 may be considered an onboard data system in number of onboard data systems 134.

Localizer and mapper 218 may be configured to simultaneously estimate a metric map of environment 100 and an estimate of a pose of mobile robot 106 within this metric map based on all data streams received at localizer and mapper 218. The metric map may be two-dimensional or three-dimensional, depending on the implementation. In one illustrative example, localizer and mapper 218 may be referred to as a simultaneous localization and mapping (SLAM) system. In these examples, the estimate of the metric map of environment 100 and the estimate of the pose of mobile robot 106 within this metric map may be sent in the form of data stream 213 to controller 114 in FIG. 1 as one of data streams 127. Data stream 213 may be one of number of first type of data streams 132 or one of number of second type of data streams 130.

In this illustrative example, indoor global positioning system 212 includes number of sensor devices 226, number of transmitters 228, and server 230. Number of transmitters 228 may be located off-board, while number of sensor devices 226 may be located onboard mobile robot 106.

Number of transmitters 228 may be configured to generate number of light signals 229. Number of light signals 229 may include at least one of a laser signal, an infrared signal, or some other type of light signal. Number of sensor devices 226 may be passive and used to sense number of light signals 229 transmitted from number of transmitters 228. Number of sensor devices 226 may send light data 231 about the sensed number of light signals 229 to server 230.

Server 230 may be configured to use this data to estimate the pose of mobile robot 106 within environment 100 over time. The estimates generated over time may form data stream 233 that may be sent to controller 114 as one of data streams 127. Data stream 233 may be one of number of first type of data streams 132 or one of number of second type of data streams 130, depending on the implementation. Server 230 may be located off-board. In this manner, server 230 may be an off-board data source which makes indoor global positioning system 212 one of number of off-board data systems 136.

Motion capture system 214 may include motion capture target 232, imaging system 234, and motion capture server 236. Motion capture target 232 may be passive and located onboard mobile robot 106. Imaging system 234 may be located off-board within environment 100 in FIG. 1 and used to generate motion capture data 235 for and track motion capture target 232. Motion capture data 235 generated by motion capture system 214 may be sent to motion capture server 236 for further processing.

Motion capture server 236 may then send motion capture data 235 in the form of data stream 237 to controller 114 as one of data streams 127. In some cases, motion capture server 236 may process motion capture data 235 to form data stream 237. Data stream 237 may be one of number of first type of data streams 132 or one of number of second type of data streams 130, depending on the implementation. Motion capture server 236 may be located off-board within environment 100. In this manner, motion capture server 236 may be considered an off-board data source, which makes motion capture system 214 one of number of off-board data systems 136.

As depicted, laser system 216 may include laser target 238 and laser sensor 240. Laser target 238 may be passive and located onboard mobile robot 106. Laser sensor 240 may be located off-board within environment 100 and used to track the movement of laser target 238. Laser sensor 240 may measure the position of laser target 238 and process this data to generate an estimate of a pose of mobile robot 106, which may form data stream 241 over time. Data stream 241 may be one of number of first type of data streams 132 or one of number of second type of data streams 130, depending on the implementation. Laser sensor 240 may send data stream 241 to controller 114 as one of data streams 127.

In this manner, various types of sensor systems and devices may be used to generate data streams 127. Number of second type of data streams 130 in data streams 127 may be processed by modifier 120 in FIG. 1 to form number of modified data streams 129. Together, number of modified data streams 129 in FIG. 1 and number of first type of data streams 132 may form plurality of data streams 126 in FIG. 1 used by pose estimator 118 to generate pose estimate 122.

Figure 3:
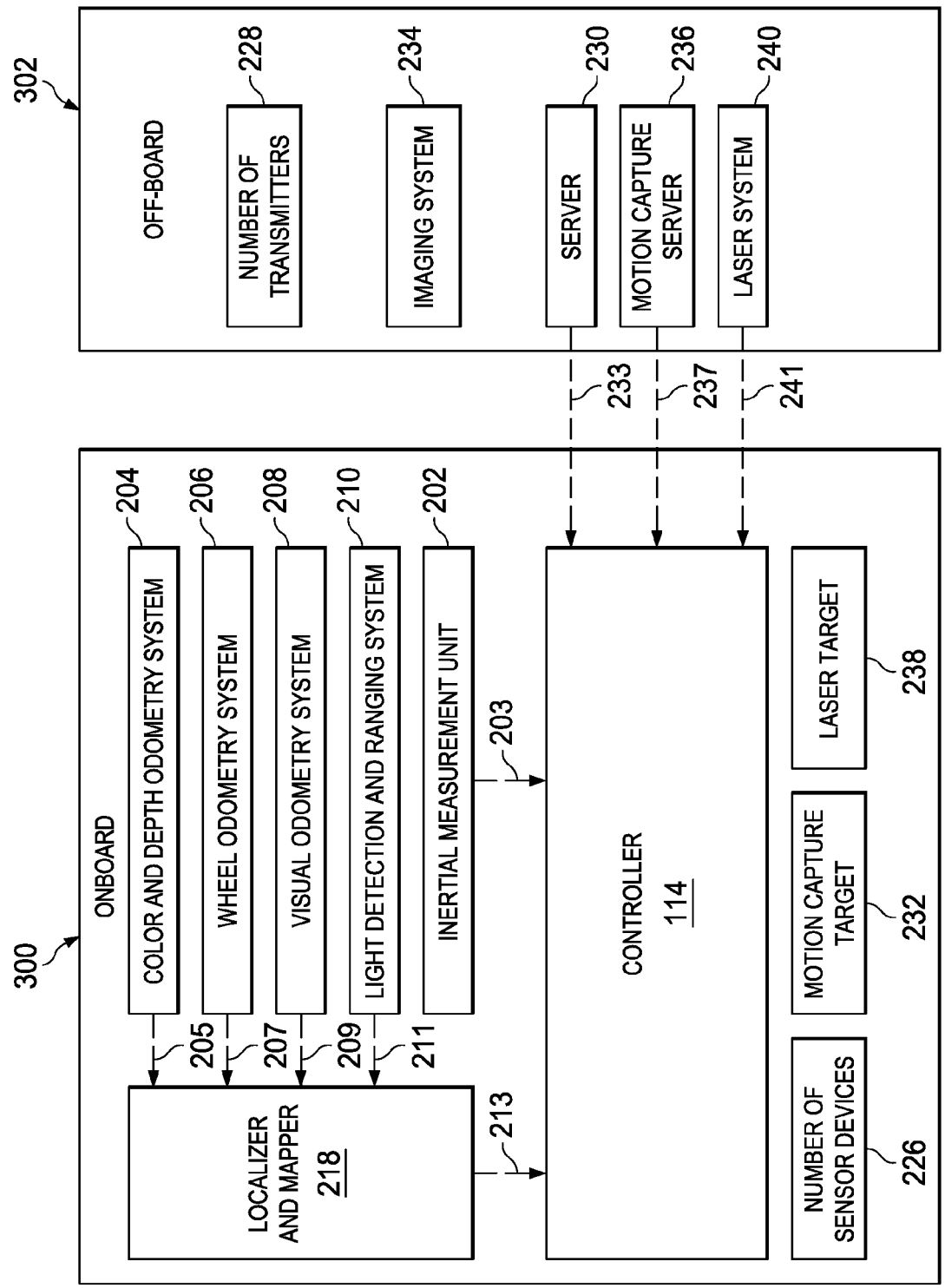
FIG. 3 is an illustration of the components of a plurality of data systems that are located onboard and the components of a plurality of data systems that are located off-board in accordance with an illustrative embodiment.

With reference now to FIG. 3, an illustration of the components of plurality of data systems 128 that are located onboard and the components of plurality of data systems 128 that are located off-board as described in FIG. 2 is depicted in accordance with an illustrative embodiment. As depicted, some of the components of plurality of data systems 128 from FIG. 2 are located onboard 300, while other components of plurality of data systems 128 from FIG. 2 are located off-board 302. In FIG. 3, onboard 300 means onboard mobile robot 106 in FIG. 1 and off-board 302 means off-board with respect to mobile robot 106 in FIG. 1.

In particular, inertial measurement unit 202, color and depth odometry system 204, wheel odometry system 206, visual odometry system 208, light detection and ranging system 210, and localizer and mapper 218 from FIG. 2 are located onboard 300. Further, number of sensor devices 226, motion capture target 232, and laser target 238 from FIG. 2 are also located onboard 300. Number of transmitters 228, server 230, imaging system 234, motion capture server 236, and laser sensor 240 may be located off-board.

In one illustrative example, color and depth odometry system 204, wheel odometry system 206, visual odometry system 208, and light detection and ranging system 210 send data stream 205, data stream 207, data stream 209, and data stream 211, respectively, to localizer and mapper 218. Localizer and mapper 218 may then use these data streams to form data stream 213 and send data stream 213 to controller 114 from FIG. 1, which is also located onboard 300. Inertial measurement unit 202 may send data stream 203 directly to controller 114. In this illustrative example, these data streams may be sent to controller 114 using any number of wired or wireless communications links.

Further, server 230, motion capture server 236, and laser sensor 240 may send data stream 233, data stream 237, and data stream 241 to controller 114. In this illustrative example, these data streams may be sent to controller 114 wirelessly.

A data steam that is sent to controller 114 may be received by pose estimator 118 if the data stream is a first type of data stream in number of first type of data streams 132 in FIG. 1 or modifier 120 if the data stream is a second type of data stream in number of second type of data streams 130 in FIG. 1.

The illustrations of environment 100 in FIG. 1, plurality of data systems 128 in FIG. 2, and the components located onboard 300 and off-board 302 in FIG. 3 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 4:
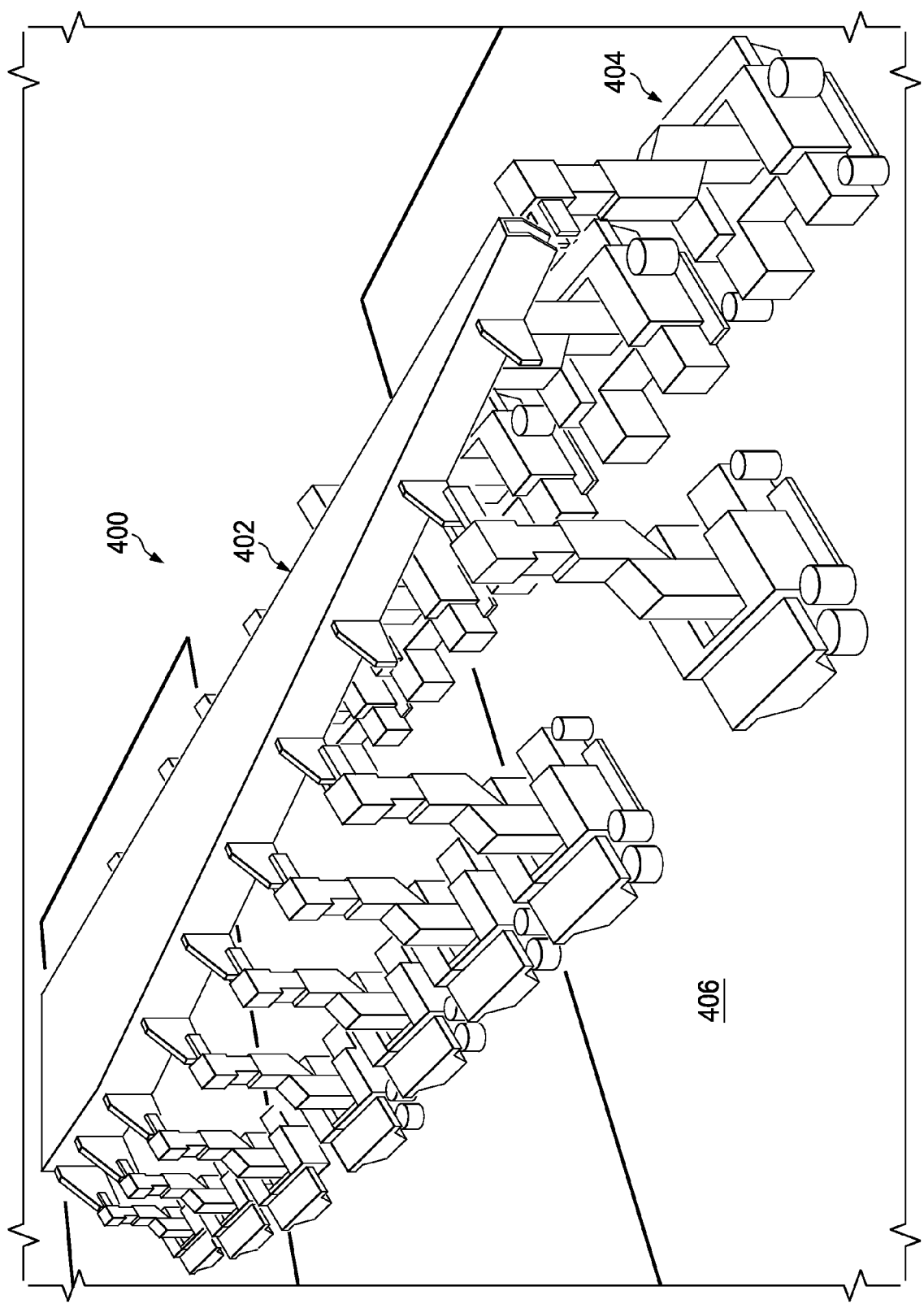
FIG. 4 is an illustration of a manufacturing environment in accordance with an illustrative embodiment.

With reference now to FIG. 4, an illustration of a manufacturing environment is depicted in accordance with an illustrative embodiment. In this illustrative example, manufacturing environment 400 may be an example of one implementation for manufacturing environment 101 in FIG. 1. As depicted, aircraft wing 402 may be manufactured within manufacturing environment 400. Aircraft wing 402 may be an example of one implementation for object 103 in FIG. 1.

Mobile robots 404 may be used to perform the operations needed to manufacture aircraft wing 402. Mobile robots 404 may be an example of one implementation for number of mobile platforms 102 in FIG. 1. In this illustrative example, mobile robots 404 may be configured to move on floor 406 of manufacturing environment 400. Each of mobile robots 404 may be capable of identifying its position within and navigating through manufacturing environment 400.

Figure 5:
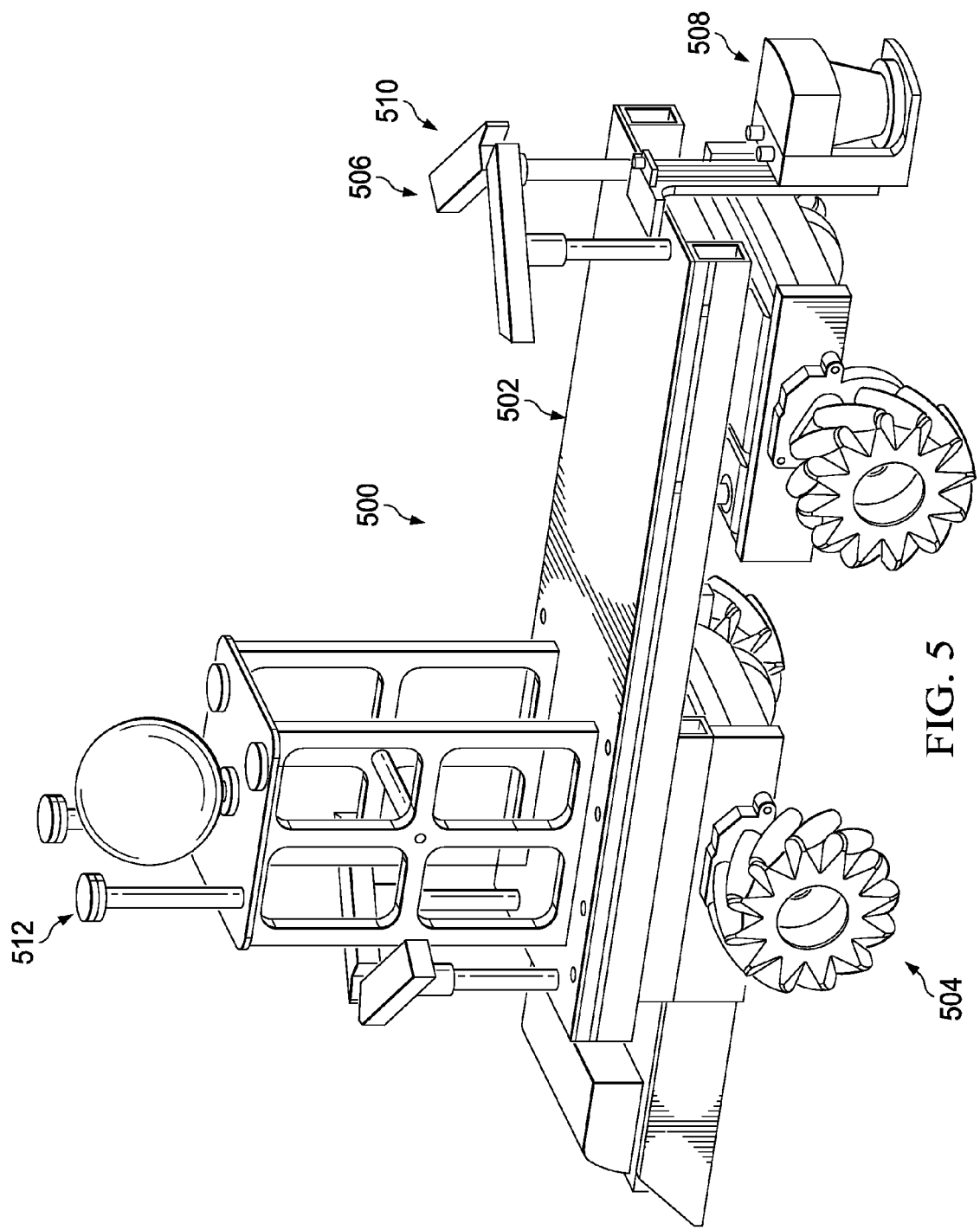
FIG. 5 is an illustration of a mobile robot in accordance with an illustrative embodiment.

With reference now to FIG. 5, an illustration of a mobile robot is depicted in accordance with an illustrative embodiment. In this illustrative example, mobile robot 500 may be an example of one implementation for mobile robot 106 in FIG. 1. Further, mobile robot 500 may be an example of one manner in which each of mobile robots 404 in FIG. 4 may be implemented.

As depicted, mobile robot 500 may include base 502, movement system 504, and plurality of devices 506. In this illustrative example, plurality of devices 506 may include light detection and ranging system 508, color and depth odometry system 510, and targets 512. Light detection and ranging system 508 may be an example of one implementation for light detection and ranging system 210 in FIG. 2. Color and depth odometry system 510 may be an example of one implementation for color and depth odometry system 204 in FIG. 2. Targets 512 may be an example of one implementation for motion capture target 232 and laser target 238 in FIG. 2.

The illustrations of FIGS. 4-5 are not meant to imply physical or architectural limitations to the manner in which an illustrative embodiment may be implemented. Other components in addition to or in place of the ones illustrated may be used. Some components may be optional.

The different components shown in FIGS. 4-5 may be illustrative examples of how components shown in block form in FIGS. 1-3 can be implemented as physical structures. Additionally, some of the components in FIGS. 4-5 may be combined with components in FIGS. 1-3, used with components in FIGS. 1-3, or a combination of the two.

Figure 6:
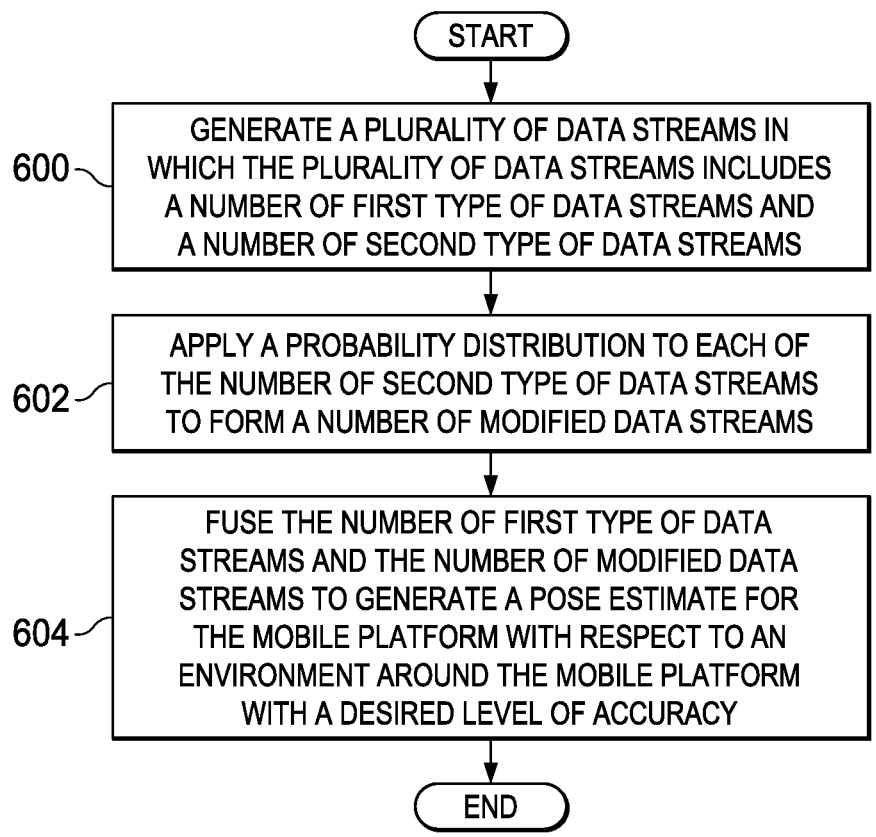
FIG. 6 is an illustration of a process for generating a pose estimate for a mobile platform in an environment in the form of a flowchart in accordance with an illustrative embodiment.

With reference now to FIG. 6, an illustration of a process for generating a pose estimate for a mobile platform in an environment is depicted in the form of a flowchart in accordance with an illustrative embodiment. The process illustrated in FIG. 6 may be implemented to manage the movement of number of mobile platforms 102 in FIG. 1.

The process may begin by generating plurality of data streams 126 in which plurality of data streams 126 includes number of first type of data streams 132 and number of second type of data streams 130 (operation 600). Next, probability distribution 137 may be applied to each of number of second type of data streams 130 to form number of modified data streams 129 (operation 602).

Thereafter, number of first type of data streams 132 and number of modified data steams 129 may be fused to generate pose estimate 122 for mobile platform 104 with respect to environment 100 around mobile platform 104 with a desired level of accuracy (operation 604), with the process terminating thereafter. In operation 604, fusing may mean using Bayesian estimation techniques to generate pose estimate 122.

Figure 7:
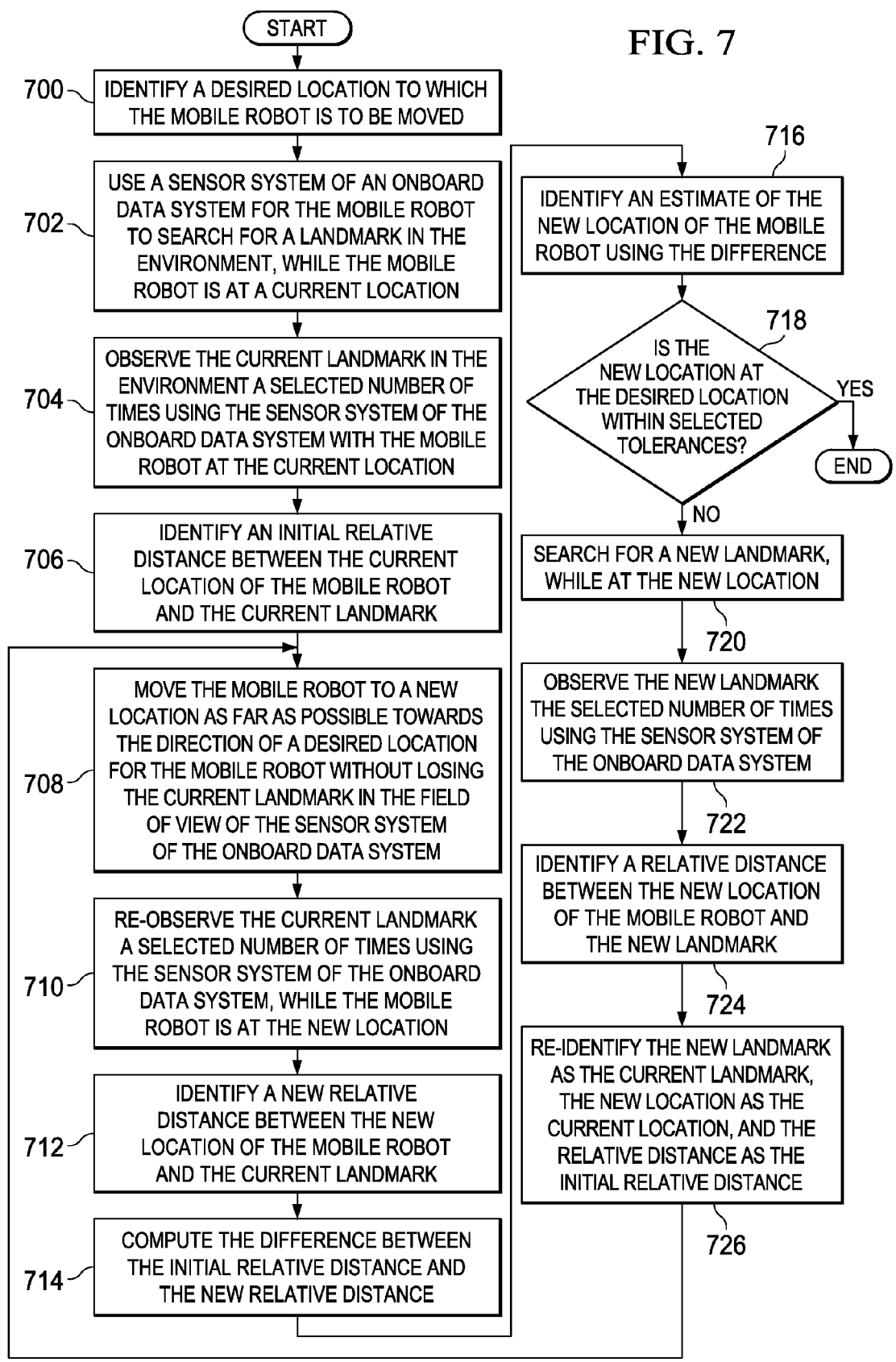
FIG. 7 is an illustration of a process for guiding a mobile robot within a manufacturing environment in the form of a flowchart in accordance with an illustrative embodiment.

With reference now to FIG. 7, an illustration of a process for guiding a mobile robot within a manufacturing environment is depicted in the form of a flowchart in accordance with an illustrative embodiment. The process illustrated in FIG. 7 may be implemented to manage the movement of mobile robot 106 within manufacturing environment 101 in FIG. 1. In particular, the process in FIG. 7 may be used to reduce the error in moving mobile robot 106 along path 117 in environment 100.

The process may begin by identifying desired location 140 to which mobile robot 106 is to be moved (operation 700). Next, a sensor system of onboard data system 144 for mobile robot 106 is used to search for landmark 146 in environment 100, while mobile robot 106 is at a current location (operation 702). Next, the current landmark in environment 100 is observed a selected number of times using the sensor system of onboard data system 144 with mobile robot 106 at the current location (operation 704). Next, onboard data system 144 identifies an initial relative distance between the current location of mobile robot 106 and the current landmark (operation 706). In operation 706, this identification may be an estimation.

Thereafter, mobile robot 106 is moved to a new location as far as possible towards the direction of desired location 140 for mobile robot 106 without losing the current landmark in the field of view of the sensor system of onboard data system 144 (operation 708). The current landmark is re-observed a selected number of times using the sensor system of onboard data system 144, while mobile robot 106 is at the new location (operation 710). The Onboard data system 144 identifies a new relative distance between the new location of mobile robot 106 and the current landmark (operation 712). In operation 712, this identification may be an estimation.

Onboard data system 144 computes the difference between the initial relative distance and the new relative distance (operation 714). An estimate of the new location of mobile robot 106 is then identified using the difference (operation 716). A determination is then made as to whether the new location is at desired location 140 within selected tolerances (operation 718). If the new location is at desired location 140 within selected tolerances, the process terminates.

Otherwise, onboard data system 144 searches for new landmark 147, while at the new location (operation 720). While at the new location, onboard data system 144 then observes new landmark 147 the selected number of times using the sensor system of onboard data system 144 (operation 722). Onboard data system 144 then identifies a relative distance between the new location of mobile robot 106 and new landmark 147 (operation 722). In operation 722, this identification may be an estimation. In this manner, new landmark 147 may be considered "correlated" with landmark 146 at the new location. The process then re-identifies new landmark 147 as the current landmark, the new location as the current location, and the relative distance as the initial relative distance (operation 724), with the process then returning to operation 708 as described above.

Turning now to FIG. 8, an illustration of a data processing system in the form of a block diagram is depicted in accordance with an illustrative embodiment. Data processing system 800 may be used to implement controller 111 in FIG. 1. As depicted, data processing system 800 includes communications framework 802, which provides communications between processor unit 804, storage devices 806, communications unit 808, input/output unit 810, and display 812. In some cases, communications framework 802 may be implemented as a bus system.

Processor unit 804 is configured to execute instructions for software to perform a number of operations. Processor unit 804 may comprise a number of processors, a multi-processor core, and/or some other type of processor, depending on the implementation. In some cases, processor unit 804 may take the form of a hardware unit, such as a circuit system, an application specific integrated circuit (ASIC), a programmable logic device, or some other suitable type of hardware unit.

Instructions for the operating system, applications, and/or programs run by processor unit 804 may be located in storage devices 806. Storage devices 806 may be in communication with processor unit 804 through communications framework 802. As used herein, a storage device, also referred to as a computer readable storage device, is any piece of hardware capable of storing information on a temporary and/or permanent basis. This information may include, but is not limited to, data, program code, and/or other information.

Memory 814 and persistent storage 816 are examples of storage devices 806. Memory 814 may take the form of, for example, a random access memory or some type of volatile or non-volatile storage device. Persistent storage 816 may comprise any number of components or devices. For example, persistent storage 816 may comprise a hard drive, a flash memory, a rewritable optical disk, a rewritable magnetic tape, or some combination of the above. The media used by persistent storage 816 may or may not be removable.

Communications unit 808 allows data processing system 800 to communicate with other data processing systems and/or devices. Communications unit 808 may provide communications using physical and/or wireless communications links.

Input/output unit 810 allows input to be received from and output to be sent to other devices connected to data processing system 800. For example, input/output unit 810 may allow user input to be received through a keyboard, a mouse, and/or some other type of input device. As another example, input/output unit 810 may allow output to be sent to a printer connected to data processing system 800.

Display 812 is configured to display information to a user. Display 812 may comprise, for example, without limitation, a monitor, a touch screen, a laser display, a holographic display, a virtual display device, and/or some other type of display device.

In this illustrative example, the processes of the different illustrative embodiments may be performed by processor unit 804 using computer-implemented instructions. These instructions may be referred to as program code, computer usable program code, or computer readable program code and may be read and executed by one or more processors in processor unit 804.

In these examples, program code 818 is located in a functional form on computer readable media 820, which is selectively removable, and may be loaded onto or transferred to data processing system 800 for execution by processor unit 804. Program code 818 and computer readable media 820 together form computer program product 822. In this illustrative example, computer readable media 820 may be computer readable storage media 824 or computer readable signal media 826.

Computer readable storage media 824 is a physical or tangible storage device used to store program code 818 rather than a medium that propagates or transmits program code 818. Computer readable storage media 824 may be, for example, without limitation, an optical or magnetic disk or a persistent storage device that is connected to data processing system 800.

Alternatively, program code 818 may be transferred to data processing system 800 using computer readable signal media 826. Computer readable signal media 826 may be, for example, a propagated data signal containing program code 818. This data signal may be an electromagnetic signal, an optical signal, and/or some other type of signal that can be transmitted over physical and/or wireless communications links.

The illustration of data processing system 800 in FIG. 8 is not meant to provide architectural limitations to the manner in which the illustrative embodiments may be implemented. The different illustrative embodiments may be implemented in a data processing system that includes components in addition to or in place of those illustrated for data processing system 800. Further, components shown in FIG. 8 may be varied from the illustrative examples shown.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in the form of a block diagram in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in the form of a block diagram in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In particular, number of mobile platforms 102 may be used during any one of the stages of aircraft manufacturing and service method 900. For example, without limitation, number of mobile platforms 102 may be used to perform operations during at least one of component and subassembly manufacturing 906, system integration 908, routine maintenance and service 914, or some other stage of aircraft manufacturing and service method 900.

In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9.

One or more apparatus embodiments, method embodiments, or a combination thereof may be utilized while aircraft 1000 is in service 912 and/or during maintenance and service 914 in FIG. 9. The use of a number of the different illustrative embodiments may substantially expedite the assembly of and/or reduce the cost of aircraft 1000.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a plurality of data systems configured to generate a plurality of data streams in which the plurality of data streams includes a first data stream generated by a first data system of the plurality of data systems and a second data stream generated by a second data system of the plurality of data systems, wherein the first data stream includes a measurement of uncertainty for the first data stream as generated by the first data system, and wherein the second data stream does not include a measurement of uncertainty for the second data stream as generated by the second data system;
   a modifier configured to apply a predetermined probability distribution to the second data stream to form a modified data stream; and
   a pose estimator located onboard a mobile platform and configured to receive and fuse the first data stream and the modified data stream to generate a pose estimate with a desired level of accuracy for the mobile platform with respect to an environment around the mobile platform.

2. The apparatus of claim 1, wherein the second data stream is received from an odometry system in the plurality of data systems.

3. The apparatus of claim 1, wherein an onboard data system in the plurality of data systems is used to observe a landmark in the environment a selected number of times for use in moving the mobile platform to a desired location within the environment.

4. The apparatus of claim 3, wherein increasing the selected number of times that the landmark is observed reduces an overall error in moving the mobile platform to the desired location within the environment.

5. The apparatus of claim 1, wherein the plurality of data systems includes a number of onboard data systems and a number of off-board data systems.

6. The apparatus of claim 5, wherein the number of onboard data systems includes at least one of an inertial measurement unit, a light detection and ranging system, a color and depth odometry system, a wheel odometry system, a visual odometry system, or a localization and mapping system.

7. The apparatus of claim 5, wherein the number of off-board data systems includes at least one of an indoor global positioning system, a motion capture system, or a laser system.

8. The apparatus of claim 1, wherein the pose estimate comprises a position and an orientation of the mobile platform with respect to the environment.

9. The apparatus of claim 1, wherein the mobile platform is a mobile robot and the environment is a manufacturing environment.

10. The apparatus of claim 1, wherein the pose estimator is configured to fuse the number of first type of data streams and the number of modified data streams using a Bayesian estimation algorithm to generate the pose estimate.

11. The apparatus of claim 1 further comprising:
    a controller configured to use the pose estimate to guide the mobile platform along a path within the environment.

12. The apparatus of claim 11, wherein the mobile platform comprises:
    a movement system configured to be controlled by the controller based on the pose estimate.

13. A mobile platform comprising:
    a base;
    a controller associated with the base and configured to receive data streams from a plurality of data systems in which the data streams include a first data stream generated by a first data system of the plurality of data systems and second data stream generated by a second data system of the plurality of data systems, wherein the first data stream includes a measurement of uncertainty for the first data stream as generated by the first data system, and wherein the second data stream does not include a measurement of uncertainty for the second data stream as generated by the second data system, and in which the controller comprises:
      a modifier configured to apply a predetermined probability distribution to the second data stream to form a modified data stream; and
      a pose estimator configured to receive the first data stream and the modified data stream as a plurality of data streams and to fuse the plurality of data streams together to generate a pose estimate with a desired level of accuracy for the mobile platform with respect to an environment around the mobile platform; and
    a movement system associated with the base and configured to be controlled by the controller based on the pose estimate to move the mobile platform within the environment.

14. A method for guiding a mobile platform within an environment, the method comprising:
    generating a first data stream by a first data system and a second data stream by a second data system, wherein the first data stream includes a measurement of uncertainty for the first data stream as generated by the first data system, and wherein the second data stream does not include a measurement of uncertainty for the second data stream as generated by the second data system;
    applying a predetermined probability distribution to the second data stream to form a modified data stream; and
    fusing the first data stream and the modified data stream to generate a pose estimate with a desired level of accuracy for the mobile platform with respect to the environment around the mobile platform.

15. The method of claim 14 further comprising:
    guiding the mobile platform along a path in the environment using the pose estimate generated for the mobile platform.

16. The method of claim 14, wherein applying the predetermined probability distribution to the to the second data stream to form the modified data stream comprises:
applying an empirical covariance to each data point in the the second data stream to form the modified data stream.

17. The method of claim 14, wherein fusing the first data stream and the modified data stream comprises:
fusing the first data stream and the modified data stream using a Bayesian estimation algorithm to generate the pose estimate with the desired level of accuracy.

18. The method of claim 14, wherein generating the first data stream and the second data stream comprises:
generating the second data stream using at least one of a color and depth odometry system, a wheel odometry system, a visual odometry system, a light detection and ranging system, or a localizer and mapper.

19. The method of claim 14 further comprising:
observing a current landmark in the environment a selected number of times using an onboard data system, while the mobile platform is at a current location;
identifying an initial relative distance between the current location of the mobile platform and the current landmark; and
moving the mobile platform from the current location to a new location as far as possible towards a desired location without losing the current landmark within a field of view of a sensor system of the onboard data system.

20. The method of claim 19 further comprising:
re-observing the current landmark the selected number of times using the onboard data system;
identifying a new relative distance between the new location of the mobile platform and the current landmark;
computing a difference between the initial relative distance and the new relative distance; and
identifying the new location of the mobile platform in the environment using the difference.

21. The method of claim 20 further comprising:
determining whether the new location is at the desired location within selected tolerances; and
moving the mobile platform closer to the desired location using a new landmark in response to a determination that the new location is not at the desired location within selected tolerances.

22. The method of claim 21, wherein moving the mobile platform closer to the desired location using the new landmark comprises:
searching for the new landmark using the onboard data system;
observing the new landmark the selected number of times using the onboard data system, while the mobile platform is at the new location; and
identifying a relative distance between the new location of the mobile platform and the new landmark.

23. The method of claim 21, wherein moving the mobile platform closer to the desired location using the new landmark further comprises:
re-identifying the new landmark as the current landmark, the new location as the current location, and the relative distance as the initial relative distance; and
repeating the steps of moving the mobile platform from the current location to the new location, identifying the new relative distance between the new location of the mobile platform and the current landmark, computing the difference between the initial relative distance and the new relative distance, identifying the new location of the mobile platform in the environment using the difference, and determining whether the new location is at the desired location within the selected tolerances.

24. The method of claim 23 further comprising:
repeating the step of moving the mobile platform closer to the desired location using the new landmark in response to the determination that the new location is not at the desired location within selected tolerances until the mobile platform reaches the desired location within the selected tolerances.

25. The apparatus of claim 1, further comprising:
a number of tools to perform a number of operations on an object;
wherein the object is one of a door for an aircraft, a skin panel for the aircraft, a wing for the aircraft, and a fuselage for the aircraft;
wherein each data point included by the first type of data streams includes a measurement of uncertainty based on a probability distribution;
wherein each data point included by the second type of data streams does not include a measurement of uncertainty;
wherein the number of first type of data streams are generated by the number of off-board data systems of the plurality of data systems and by a number of onboard data systems of the plurality of data systems;
wherein the number of second type of data streams are generated by the number of off-board data systems of the plurality of data systems and by the number of onboard data systems of the plurality of data systems;
wherein the number of onboard data systems includes an inertial measurement unit, a light detection and ranging system, a color and depth odometry system, a wheel odometry system, a visual odometry system, and a localization and mapping system; and
wherein the number of off-board data systems includes an indoor global positioning system, a motion capture system, and a laser system.

* * * * *